United States Patent [19]
Boye et al.

[11] Patent Number: 5,266,207
[45] Date of Patent: Nov. 30, 1993

[54] COMPOSITE NANOFILTRATION MEMBRANE

[75] Inventors: Anne Boye, Narbonne; Andre Grangeon, Valreas; Christian Guizard, Gignac, all of France

[73] Assignee: Techsep, Courbevoie, France

[21] Appl. No.: 876,441

[22] Filed: Apr. 30, 1992

[30] Foreign Application Priority Data

Apr. 30, 1991 [FR] France .................. 91 05301

[51] Int. Cl.$^5$ .................. B01D 61/00; B01D 29/00
[52] U.S. Cl. .................. 210/653; 210/490; 210/500.28; 210/506; 210/509; 210/651
[58] Field of Search .................. 210/490, 500.38, 506, 210/500.27, 500.28, 651, 510.1, 500.25, 500.26; 524/405; 264/165

[56] References Cited

U.S. PATENT DOCUMENTS

| | | | |
|---|---|---|---|
| 4,230,463 | 10/1980 | Henis et al. | 55/16 |
| 4,710,204 | 12/1987 | Kraus et al. | 55/16 |
| 4,728,348 | 3/1988 | Murphy | 55/158 |
| 4,749,469 | 6/1988 | Allen et al. | 210/500.28 |
| 4,749,489 | 7/1988 | Allen et al. | 210/500.28 |
| 4,783,202 | 1/1988 | Kraus et al. | 55/16 |
| 4,814,132 | 3/1989 | Aoki et al. | 264/165 |
| 4,880,441 | 1/1989 | Kesting et al. | 55/16 |

FOREIGN PATENT DOCUMENTS

| | | |
|---|---|---|
| 0175668 | 3/1986 | European Pat. Off. . |
| 02500327 | 12/1987 | European Pat. Off. . |
| 0266204 | 5/1988 | European Pat. Off. . |
| 0288380 | 10/1988 | European Pat. Off. . |
| 2542211 | 9/1984 | France . |
| 8806477 | 9/1988 | PCT Int'l Appl. . |
| 2139237 | 11/1989 | United Kingdom . |

OTHER PUBLICATIONS

Proc First Intern Conf. Inorganic Membranes'1989, Montpellier (Fr) Jul. 1989, 3-6, pp. 55-64, 1990 C. Guizard et al: A New Generation of Membranes etc.

Primary Examiner—Robert A. Dawson
Assistant Examiner—Ann M. Fortuna
Attorney, Agent, or Firm—Burns, Doane, Swecker & Mathis

[57] ABSTRACT

Mechanically strong and thermally/chemically-resistant composite nanofiltration membranes, well adapted for the separation of low molecular weight compounds, comprise a porous inorganic support substrate, the pore diameters of which ranging from 3 to 10 nm, this inorganic support substrate having a polymer membrane which comprises an elastomeric polyphosphazene densely deposited on at least one of the face surfaces thereof, the structural porosity of such polyphosphazene membrane ranging from 0.2 to 2 nm.

16 Claims, 4 Drawing Sheets

COMPOSITE NANOFILTRATION MEMBRANE

BACKGROUND OF THE INVENTION

1. Field of the Invention

The present invention relates to a composite nanofiltration membrane, a process for the production thereof and to the use of same for the separation of low molecular weight compounds.

2. Description of the Prior Art

Nanofiltration is a known separation technique which is situated at the boundary between reverse osmosis and ultrafiltration.

Reverse osmosis employs a typically organic or sometimes inorganic membrane, the mass transfer therethrough being based on diffusion. The fluid to be treated diffuses through the membrane. The molecular weight cut-off of the membrane is generally below 100 daltons.

Ultrafiltration also employs an organic or inorganic membrane whose pore size typically ranges from 5 to 100 nm. The liquid effluent passes through the pores of the membrane according to a convective flux. The molecular weight cutoff of the membrane is generally above 1,000 daltons.

As utilized herein, by the term "nAnofiltration membrane" is intended a membrane having a molecular weight cutoff from about 100 to 1,000 daltons.

With such membranes, retention is low for salts (monovalent anion) and nonionized organic molecules of molecular weight below 100; it is high for organic molecules of molecular weight above 300, as well as for multivalent salts, which, in this latter case, is not desirable in this type of separation.

For such nanofiltration membranes, the molecular weight cutoff corresponds to a molecular size in the nanometer range and, therefore, circumscribes the domain of separation situated between reverse osmosis and ultrafiltration.

Organic, optionally composite, nanofiltration membranes are known to this art. However, they present the disadvantages of being mechanically and thermally fragile and sensitive to chemical attack.

Inorganic membranes, tubular membranes in particular, exhibit high chemical, mechanical and thermal resistance, which is one of the principal reasons for their current development in the field of ultrafiltration. However, no membrane of this type is believed to exist which is completely inorganic and permits nanofiltration separations to be carried out.

A membrane which may be a hyperfiltration membrane comprising a porous support made of inorganic material and a microporous membrane made of organic polymer is described in EP-250,327.

The polymeric microporous membrane is an asymmetric and cellular, namely, alveolar, membrane, deposited within the pores of the inorganic membrane by a process of preparation via phase inversion, comprising a stage for coagulation of the polymer and a final heat treatment.

In order to obtain an asymmetric and cellular membrane, the pores of the macroporous inorganic membrane have a high mean pore radius of between 0.5 and 1 $\mu$m according to the examples of this '327 patent, which corresponds to a microfiltration membrane.

Furthermore, the polymer thicknesses indicated in the patent (25 to 200 $\mu$m) are incompatible with a nanofiltration process.

The principal disadvantage of such composite membranes is the alveolar cellular structure of the organic membrane which confers thereon a certain fragility, especially under the influence of high pressures given the large pore diameter of the inorganic support substrate employed.

C. Guizard et al, *Proc. FICTIM' 89* —Montpellier, France, 3-6 July 1989, p. 75-85 (1990) indicates the possibility of using inorganic polymers, polyphosphazenes among others, for producing hyper- or nanofiltration membranes on a porous inorganic membrane. However, this publication does not indicate the pore diameter of the inorganic substrate and the desired results are not attained, since the saccharose retention reported on page 83 does not exceed 50%. Moreover, this publication does not indicate the polyphosphazene deposition technique.

EP-A 302,928 describes an inorganic ultrafiltration membrane coated with a hydrophilic organic polymer, which is more particularly suitable for protein separation. This membrane permits only ultrafiltration operations to be performed.

SUMMARY OF THE INVENTION

Accordingly, a major object of the present invention is the provision of a nanofiltration membrane whose mean pore diameter is in the nanometer (nm) range, namely, ranging from 0.2 to 2 $\mu$m, comprising a porous inorganic support and a polymer membrane deposited therewithin and/or thereon.

Another object of the present invention is the provision of a composite membrane of the above type which permits an almost total retention of organic molecules having a molecular weight ranging from about 100 to 1,000 daltons.

Another object of this invention is the provision of a composite membrane of the above type whose molecular weight cutoff can vary by mere variation of the pressure applied to the fluid to be treated.

Still another object of the present invention is the provision of a composite membrane of the above type whose polymer membrane is a dense and elastomeric coating.

Yet another object of this invention is the provision of a composite membrane of the above type for which the constituent polymer of the membrane displays both an elastomeric character and good thermal, chemical and mechanical resistance, as well as good resistance to large pressure variations.

Still another object of the present invention is the provision of a composite nanofiltration membrane substantially having the properties of an inorganic membrane while comprising a superficial organic polymer membrane layer.

Briefly, the present invention features a composite nanofiltration membrane comprising a porous inorganic support substrate and a nanoporous polymer membrane, said porous inorganic support substrate having a pore diameter ranging from 3 to 10 nm, and which nanoporous polymer membrane comprises a dense deposit of an elastomeric polyphosphazene produced on at least one of the face surfaces of the porous support and the structural porosity of which ranges from 0.2 to 2 nm.

DETAILED DESCRIPTION OF THE PREFERRED EMBODIMENTS OF THE INVENTION

More particularly according to the present invention, the porous inorganic support substrates are per se known to this art and themselves constitute membranes.

They are generally provided, but not necessarily, in the form of tubes comprising a macroporous support which is typically fabricated of metal or of metallic alloy (for example of nickel or of nickel alloy), of stainless steel, of carbon, or alternatively of a ceramic material such as an oxide, a carbide, a nitride or a silicide such as, for example, alumina or silicon carbide. At least one inorganic membrane layer typically fabricated from at least one metallic oxide layer of a metal which is characteristically beryllium, magnesium, calcium, aluminum, titanium, strontium, yttrium, lanthanum, zirconium, hafnium, thorium, iron, manganese, silicon, or the like, is deposited on at least one of the two face surfaces of the porous support by any appropriate technique. The most commonly used oxides are titanium, aluminum and zirconium oxides, combined with macroporous support substrates made of carbon or alumina.

The preferred porous inorganic support according to the invention is a porous tubular support made of carbon or alumina coated with at least one membrane layer of particles of oxide which is typically partially sintered and selected from among a titanium oxide, alumina and zirconia. It is advantageous to deposit several layers of oxide of decreasing particle size until a porous inorganic support is provided which has a pore diameter ranging from 3 to 10 nm, preferably from 4 to 8 nm.

Porous inorganic supports of the above type and processes for the production thereof are described, in particular, in U.S. Pat. Nos. 3,413,219, 3,449,245 and 2,537,988, and in EP-A-40,282, EP-A-92,480 and FR-A-2,150,390.

The porous inorganic support has, on at least one of its face surfaces, a microporous polymer membrane comprising a dense layer (coating) of an elastomeric polyphosphazene. This polymer membrane layer has a structural porosity ranging from 0.2 to 2 nm, preferably from 0.8 to 1.5 nm.

This layer is dense, namely, as opposed to the layer which is the subject of EP-1,250,327, it is not alveolar. It is therefore a layer which is substantially isotropic and whose porosity is of structural origin, preferably in the region of 1 nm.

The dense polymer membrane layer may be nested into the pores of the porous inorganic support which are level with this surface without projecting beyond the surface of the porous support and/or forming a continuous polymer coating (film) completely masking the coated surface of the porous inorganic support.

The essential requisite is for this layer to have the appropriate structural porosity according to the invention.

The thickness of polymer deposited on the porous inorganic support advantageously ranges from 0.1 to 10, preferably from 0.5 to 5 μm.

According to the present invention, by "elastomeric polyphosphazene" is intended a material based on a substantially linear polymer sequence which is capable of regaining its initial structure after being subjected to a mechanical stress (pressure).

The polymer used to form the elastomeric polymer membrane layer is preferably selected from among the polyphosphazenes having the general formula:

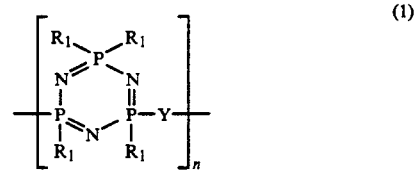

in which the radicals $R_1$, which may be identical or different, have the formula:

in which $R_2$ and $R_3$, which may be identical or different, are each a linear or branched aliphatic hydrocarbon radical, optionally substituted by fluorine atoms and having from 1 to 12 carbon atoms, a cycloalkyl radical having from 3 to 8 carbon atoms, an aryl, alkylaryl or aralkyl radical having from 6 to 18 carbon atoms, the alkyl moieties of which having from 1 to 4 carbon atoms and a heterocycle having from 3 to 20 carbon atoms, the heteroatoms of which being selected from among O, S and N, with the proviso that $R_2$ and $R_3$ may together form, with the nitrogen atom from which they depend, a heterocycle having from 3 to 15 carbon atoms and which may also comprise another heteroatom selected from among O, S and N.

The radicals Y have the formula:

in which the radicals $R_4$, which may be identical or different, are each a hydrogen atom or a radical $R_2$ or $R_3$; Z is a divalent hydrocarbon radical having from 1 to 20 carbon atoms and which may comprise at least one heteroatom selected from among O, N and S, with the proviso that two radicals $R_4$, together with Z, may form a heterocycle having from 3 to 15 carbon atoms; and n is an integer ranging from 10 to 30,000, preferably from 20 to 5,000.

The following radicals are exemplary of the radicals $R_1$:

Diphenylamino $(C_6H_5)_2N-$

N-Naphthyl-2-N-propylamino

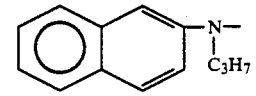

Aziridino

Imidazolyl

-continued
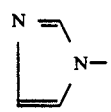
Pyrollyl
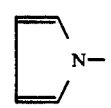
Indolyl
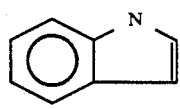
Pyrrolinyl
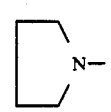
2-Imidazolinyl
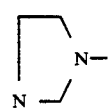
Piperidinyl
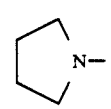
Morpholino
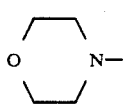
Dibutylamino
$(C_4H_9)_2N-$
Quinolinyl
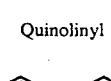
The following are exemplary of the radicals Y:
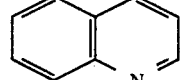
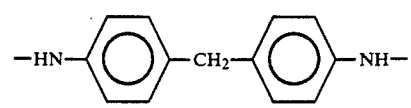
-continued
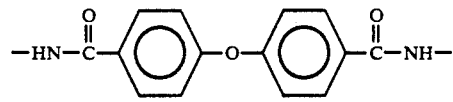
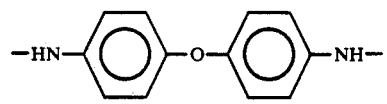
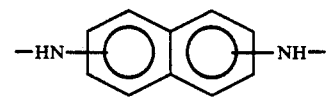
$-HN-(CH_2)_6-NH-$
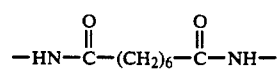
$-HN-(CH_2)_4-NH-$,
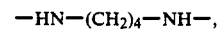
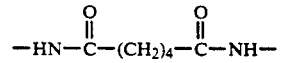
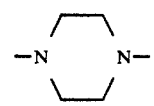
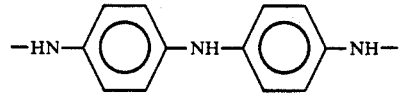
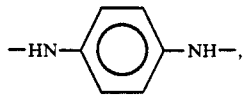
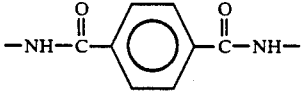
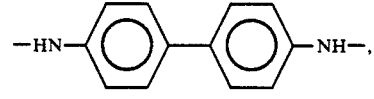
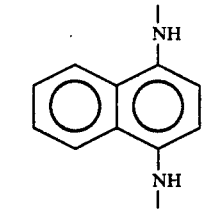
The polyphosphazenes of formula (I) may be prepared, especially, from hexachlorocyclotriphosphazene having the formula:

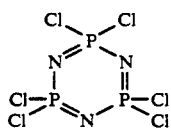

(4)

In a first state (a), partial aminolysis is carried out of the compound of formula (4) by means of a secondary amine of the formula:

(5)

in which $R_2$ and $R_3$ are as defined above.

The reaction of a secondary amine of formula (5) provides the compound of formula (6) below, preferbly unpaired, namely, the two remaining chlorine atoms are not present on the same phosphorus atom:

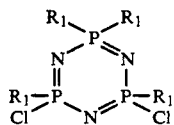

(6)

in which $R_1$ is as defined above.

The aminolysis reaction of stage (a) is preferably carried out in a solvent medium. This solvent may be the amine (5), employed in excess. Chloroform, hydrocarbon solvents (benzene, toluene, xylene), acetonitrile, ethers (diethyl ether, tetrahydrofuran) may also be used as the solvent. It is advantageous that the reaction medium be maintained anhydrous in order to avoid hydrolysis of the phosphorus/chlorine covalent bonds.

Moreover, if the amine (5) is a base which is too weak, it is desirable to add to the reaction medium an acid-acceptor such as triethylamine or pyridine, in order to precipitate the amine hydrochloride by-product formed, from the reaction medium.

The temperature of the reaction medium has an influence on the level of substitution of the chlorines of the starting material (1). High temperatures promote complete substitution and vice versa.

One skilled in this art, by judicious selection of reagents and solvents, and through routine experiments, can easily determine the operating conditions permitting preparation of the desired product of formula (6), preferably unpaired.

A diamine of formula:

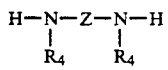

(7)

in which $R_4$ and Z are as defined above, is polycondensed with the compound of formula (6) in the presence of a solvent, which also preferably serves as an acceptor of released hydrochloric acid, such as pyridine and triethylamine, and the desired polymer of formula (1) is obtained and purified by a series of washes and then dried. Examples of preparation of cyclolinear polyphosphazenes are reported in U.S. Pat. No. 4,749,489.

The present invention also features a process for producing a composite nanofiltration membrane from an elastomeric polyphosphazene.

In a first embodiment thereof, the separating-membrane layer of the porous inorganic support is contacted with a solution of at least one elastomeric polyphosphazene for a period of time sufficiently long to adsorb the polymer onto and/or into the membrane layer of the porous inorganic support substrate.

It is possible to saturate the porous support beforehand with solvent for the polymer in order to enhance its subsequent adsorption. Ethoxyethanol, methanol and chloroform are particularly exemplary solvents for the polymer.

After the adsorption stage, the non-adsorbed polymer can be removed by rinsing with this same solvent.

The formation of the polymer membrane is completed by a heat treatment at a temperature ranging from 80° to 150° C. for about 24 hours.

In another embodiment, the process is carried out using a polyphosphazene-based diion whose solvating power has been adjusted, for example using an ethoxyethanol/water mixture (75%/25% by volume).

It is generally advantageous that the boiling temperature of the nonsolvent product (water) should be lower than the boiling temperature of the solvent product (ethoxyethanol), to avoid phase inversion.

The membrane layer of the inorganic support is saturated, for example, by mere contact and then after an optional rinse; the formation of the membrane is completed by a heat treatment at 80° to 150° C. for about 24 hours.

The composite membranes according to the invention are characterized by good transfer properties and by high resistance to temperature, pressure variations, organic solvents and chemical agents.

The inorganic moiety of the polyphosphazenes imparts a better mechanical, chemical and thermal resistance to the composite membranes. Moreover, the appropriate selection of the organofunctional groups of the polymer (in the case of the polymer of formula (1), the radicals $R_1$ and Y) makes it possible to enhance its properties and to provide other advantageous properties during their use in nanofiltration, the hydrophilic or hydrophobic property in particular. In the case of hydrophilicity, it is advantageous to provide hydrocarbon radicals $R_1$ having benzene and/or heterocyclic nuclei comprising heteroatoms selected from among O, N and S.

In the case of hydrophobicity, it is advantageous to provide perfluoroalkyl $R_1$ radicals.

It will be appreciated that the composite membranes according to the invention combine the advantageous properties of organic membranes and ceramic membranes without exhibiting the disadvantages thereof.

Indeed, the membranes according to the invention, like reasonably-priced organic membranes, are easily shaped and have a good mechanical resistance. On the other hand, they exhibit a much better resistance to temperature, pressure, solvents and chemical agents.

Moreover, the membranes according to the invention, like ceramic membranes, exhibit a good resistance to temperature, pressure and chemical agents. On the other hand, they are more reasonably priced, more easily shaped and exhibit a better mechanical resistance.

Accordingly, the membranes according to the invention are resistant to chemical agents in a pH range of from 1 to 13 under pressure conditions ranging up to 30 bars and above and at temperatures which may be as high as about 200° C.

The membranes according to the invention permit nanofiltration of organic effluents which are very difficult to treat using purely organic membranes, which are especially sensitive to solvent attack, and impossible to treat using inorganic membranes whose pore size is inadequate to retain small-sized inorganic molecules.

Indeed, the membranes according to the invention have a structural porosity in the nanometer range and permit an excellent level of retention (very close to or equal to 100%) for molecules of molecular weight of from 100 to 1,000. Moreover, the molecular weight cutoff of these membranes, which generally ranges from 100 to 1,000 daltons, may be adjusted by mere variation of the pressure (for example in the 1 to 30 bar range) exerted on the effluent to be treated in contact with the separating layer of the membrane. This very advantageous property, which enables only one membrane to be used for separating molecules of differing molecular weight, is essentially due to the elastomeric character of the polyphosphazene used.

This elastomeric character is unavoidably encountered when the preferred polycyclophosphazenes of formula (1) are used. One skilled in this art, using routine experiments, can also provide elastomeric polyphosphazenes, for example the polyphosphazenes of the formula:

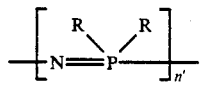

which are, for example, described in the U.S. Pat. Nos. 6,868,478 and 4,710,204, and in EP-A-335,775 and EP-A-312,435.

The present invention also features a process of nanofiltration separation, of molecules of molecular weight ranging from 100 to 1,000, wherein a composite membrane as described above is used and the molecular weight cutoff of said membrane is adjusted to the desired value by varying the pressure of the effluent to be treated in contact with the membrane.

In order to further illustrate the present invention and the advantages thereof, the following specific examples are given, it being understood that same are intended only as illustrative and in nowise limitative.

EXAMPLE 1

Preparation of the polyphosphazene

1. Synthesis of dichlorotetramorpholinocyclotriphosphazene

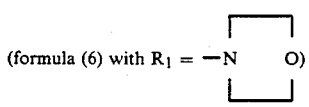

Hexachlorocyclotriphosphazene P₃N₃Cl₆ (34.76 g; 0.1 mole) and 150 ml of anhydrous benzene were introduced into a 4-necked 1,000 ml round-bottomed flask provided with efficient mechanical stirring, a thermometer, a dropping funnel and a condenser. When the solubilization was complete, and the temperature of the medium was stabilized at 16° C. by means of a water-/crushed ice bath, the anhydrous morpholine (69 ml; 0.8 mole), diluted in 100 ml of anhydrous benzene, was added through the dropping funnel slowly, dropwise, over two hours, with vigorous stirring and at a reaction temperature of between 16° and 18° C.

After reaction for 4 hours under the same conditions throughout, the mixture was permitted to stand at room temperature for 15 hours and it was then heated at 35° C. for 6 hours with vigorous stirring. The morpholinium hydrochloride precipitate obtained was separated by filtration. Half of the benzene solution was evaporated under vacuum produced by a primary pump. The precipitate formed was filtered and half of the filtrate was again evaporated. This operation was again repeated. The three precipitates were recrystallized from ethyl acetate until the two trans- and cis-isomers were obtained which were distinguished by their melting points, i.e., 147°–149° C. and 161°–163° C., respectively.

2. Synthesis of poly(p-oxydianilinetetramorpholinocyclotriphosphazene):

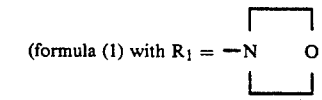

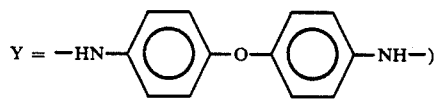

Dichlorotetramorpholinocyclotriphosphazene (7.89 g; 0.0144 mole) was dissolved in 70 ml of pyridine in a 4-necked 1,000 ml round-bottomed flask provided with efficient magnetic stirring, a thermometer, a dropping funnel, and a condenser, enveloped in aluminum foil to avoid exposure to light and flushed with nitrogen. After complete dissolution, the medium was heated to 100°–105° C. and then p-oxydianiline (3.6 g; 0.018 mole, namely, the number of moles ensuring stoichiometry and a 25% excess) dissolved in 80 ml of pyridine was added dropwise over 1 hour. The mixture was heated at the reflux temperature of pyridine, i.e., 115° C., for 18 hours. Finally, the temperature was permitted to re-equilibrate to around 40° C. and part of the pyridine was evaporated under vacuum produced by a primary pump. The solubilized polymer was precipitated with distilled water; the precipitate obtained was filtered on sintered glass, copiously washed with distilled water to remove pyridinium hydrochloride and pyridine, and dried at about 85°–100° C. under vacuum. The polymer was then ready for use.

EXAMPLE 2

Production of the membrane

A composite inorganic membrane 15 cm in length, having an inner diameter of 0.6 cm, an outer diameter of 1 cm, comprising two superposed membrane layers made of zirconia, was used as a starting support tube. The mean diameter of the pores in the final layer was 5 nm.

The polyphosphazene obtained in Example 1 was purified by three washes with water and then dried. A collodion was prepared by dissolving 0.35 g of polyphosphazene in 5 cc of a mixture of 75% ethylcellosolve ® and 25% water.

The solution obtained was clear and it was cooled to −5° C. for 20 minutes with a support tube and the deposition was then carried out at room temperature by filling the support tube with the collodion. The tube thus filled was maintained at −5° C. for 10 minutes and it was then emptied of the collodion and subjected to a heat treatment at 100° C. for 24 hours.

Clean cuts of the membranes thus obtained were sealed using a varnish so as to avoid, during filtration, the passage of the feed solution into the permeate through these clean cuts. For that purpose, the ends of the membranes were immersed in a varnish over about 1 cm, maintained for 12 hours at room temperature and then dried for 1 hour to 2 hours at 80° C.

The membrane obtained thereby had a tubular form with an inner diameter of 0.6 cm and with a length of 15 cm. The active length of the membrane was 13.15 cm and, consequently, its active inner surface are was $24.79 \times 10^{-4} m^2$.

The thickness of the polymer layer was about 0.8 μm.

DETAILED DESCRIPTION OF DRAWINGS

A detailed description of drawings is given through examples 3-4.

EXAMPLE 3

Figure 1:
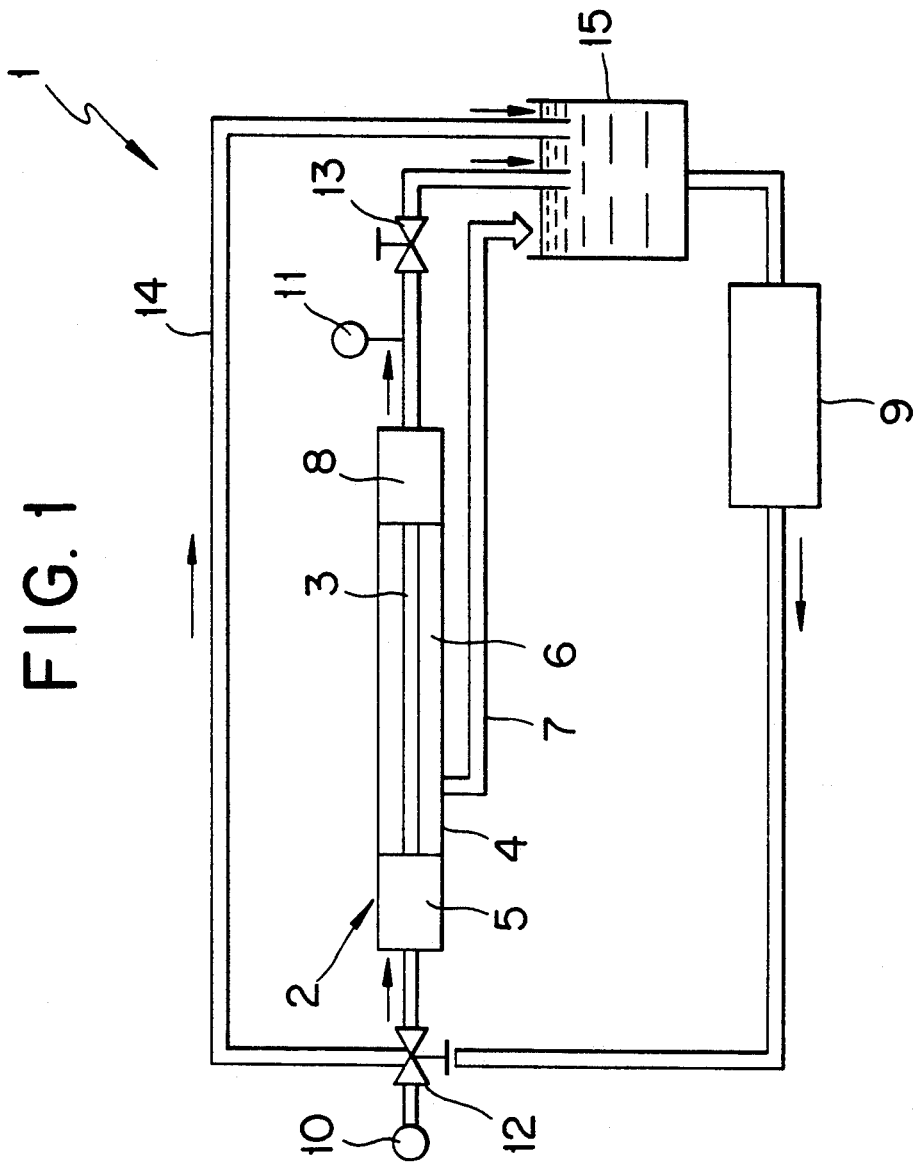
FIG. 1 shows a system having a membrane module comprising the membrane of the invention.

In this example, nanofiltration operations were carried out using a circulation loop schematically illustrated in FIG. 1 of the attached drawings. This loop 1 comprised a nanofiltration module 2 including the membrane 3 prepared in Example 2, arranged inside a housing 4 divided into three compartments, a compartment 5 for introducing the solution to be treated, a compartment 6 for recovering the permeate discharged from the conduit 7 and a compartment 8 for discharging the material which was retained.

This loop comprised, in addition, a pump 9 for feeding the solution to be treated, serving both as a feed pump applying the desired pressure and as a recirculation pump enabling the solution to be treated to circulate inside the loop in a closed circuit. This loop comprised, in addition, two pressure gauges 10 and 11, two valves 12 and 13, an overflow conduit 14 opening into the reservoir 15 containing the solution to be treated. The valves 12 and 13, together with the gauges 10 and 11, permit the pressure to be regulated.

The loop also included a heat exchanger (not shown) which stabilized the temperature of the solution and a thermometer (not shown) which measured the temperature of the solution.

This loop operated according to a continuous process in a closed circuit. The solution to be treated was fed into the module and then returned into the reservoir, as did the permeate (with the exception of the samples required for analysis), such as to maintain the concentration of the solution to be treated at a constant value. The permeate flux density was calculated by measuring the amount of permeate collected over a given time and divided by the effective surface area of the membrane.

Four types of solutions to be treated, designated (a), (b), (c) and (d), were used:

(a) Drinking water;

(b) The same water containing, in addition, sodium chloride (weight, 58 g—diameter φ of Na+, 0.194 nm; diameter φ Cl−, 0.362 nm) at a concentration of 0.1M, (c) The same tap water solubilizing "Yellow Acid 42 ®" (weight, 759 g, φ=1.4 nm) to about 0.0013M, (d) The same tap water solubilizing sacchrose (weight, 342 g, φ=1.025 nm) to about 0.1M.

The permeates obtained were characterized using five physical methods adapted to each type of solute:

(1) Conductimetry and ion exchange chromatography permitted salt retention to be obtained (as sodium chloride and sulfate);

(2) Polarimetry and refractometry measured the retention of saccharose, a molecule which had a specific rotation;

(3) Absorption spectrophotometry gave the retention of Yellow Acid, a colored molecule which absorbs in the visible and ultraviolet region.

Example 3a: measurement of the permeability Pe of tap water (a) at constant pressure (10 bars) as a function of the water temperature.

Figure 2:
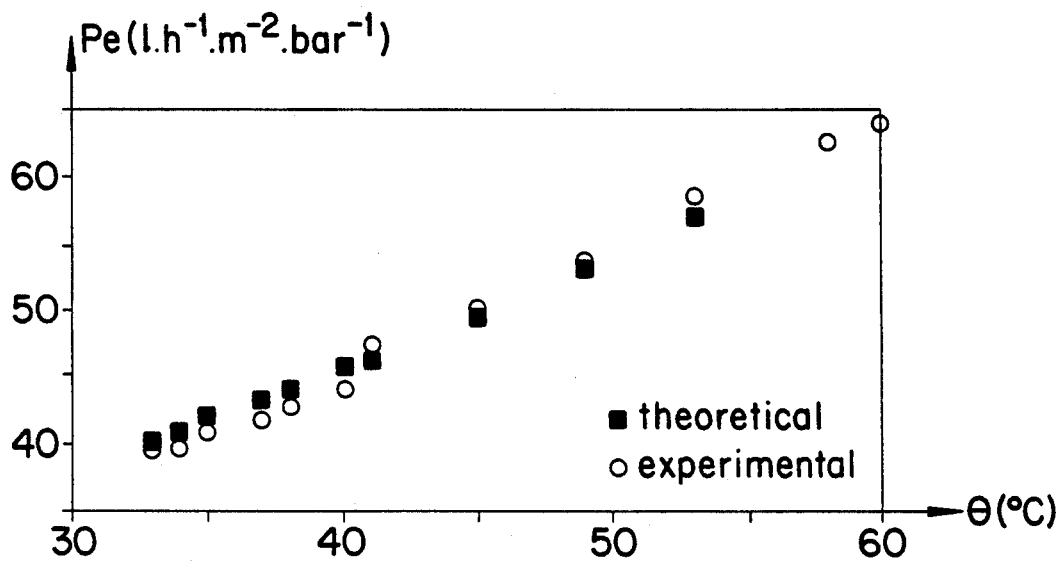
FIGS. 2 and 3, show variation of water permeability as function of temperature for uncoated, and coated inorganic membranes respectively.
Figure 3:
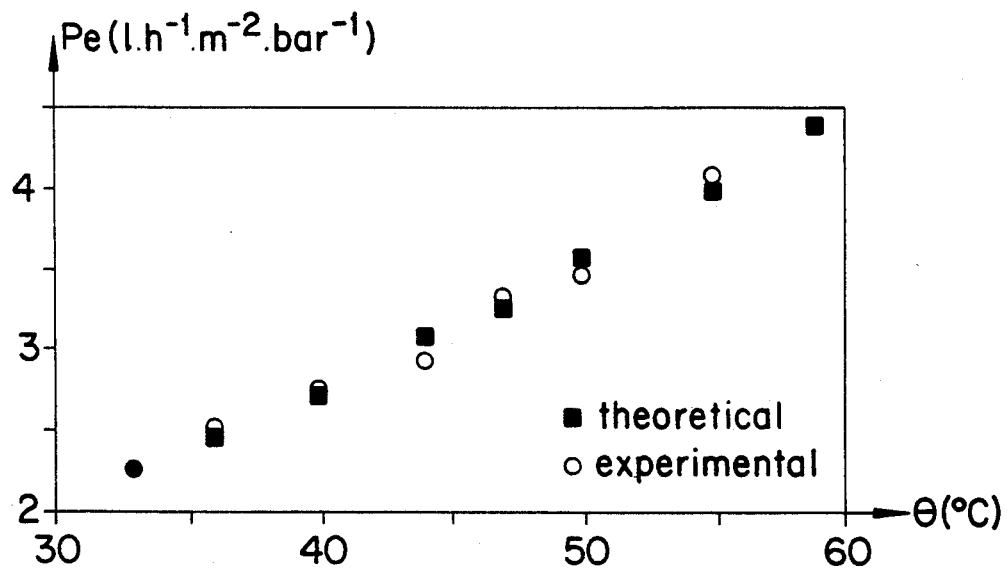

The circulation loop described above, whose reservoir 15 was filled with water (a), was used; a first series of measurements was carried out using an inorganic membrane of Example 2 not coated with polymer (FIG. 2) and a membrane of Example 2 coated with polymer (FIG. 3). The results obtained are presented in FIGS. 2 and 3 which represent a graph where the temperatures θ (°C.) are plotted on the x-axis and the theoretical and experimental permeability, obtained in $1 \cdot h^{-1} \cdot m^{-2} \cdot bar^{-1}$, on the y-axis.

Comparison of the permeabilities Pe in FIGS. 2 and 3 indicate that at constant pressure and quasistationary regime, the flow resistance of the membrane of Example 2 was about 10-fold higher than that of the support tube. Moreover, an increase in temperature effected an increase in the water permeability by 2.3% and 3.7% per degree Celsius, respectively, for the inorganic support and the polymer membrane. This difference is likely the result of a transfer regime of a different nature.

Figure 4:
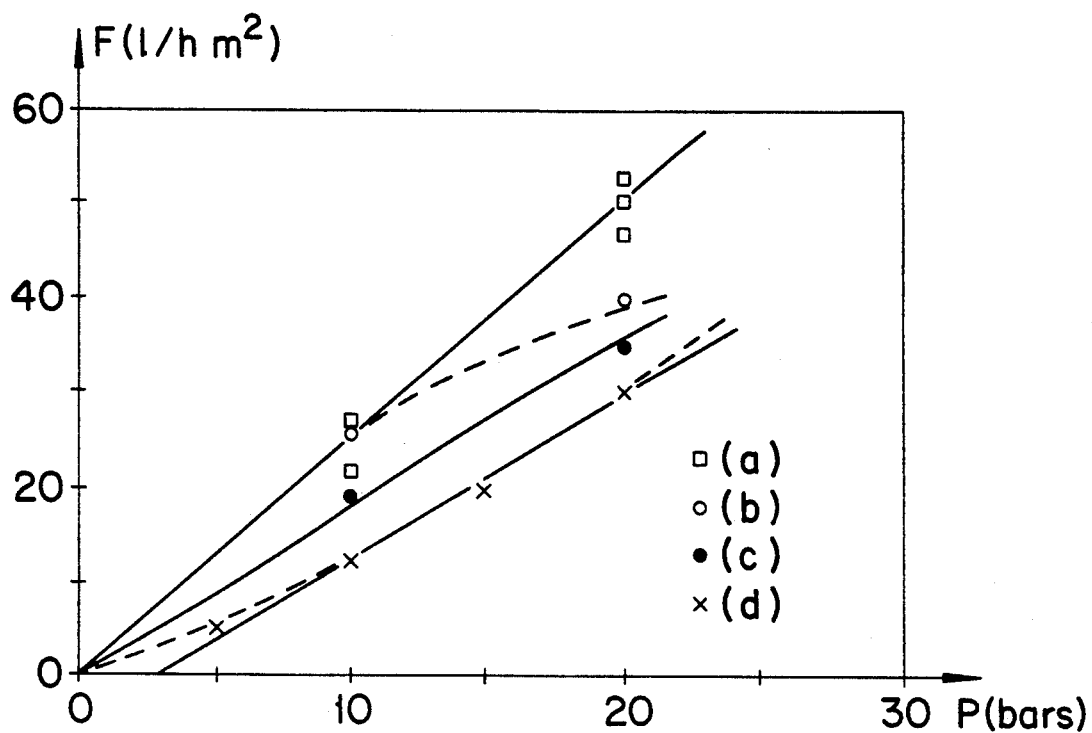
FIG. 4 shows variation of membrane flux as function of time.

Example 3b: In this example, the flux density F of the permeate was measured in liters per hour and per m² of membrane as a function of the pressure P (in bars) for the four solutions (a), (b), (c) and (d). The results obtained are presented in FIG. 4 where the pressures P (bars) are plotted on the x-axis and the flux densities F (1/h.m²) are plotted on the y-axis. According to FIG. 4, it is observed that the higher the increase in pressure, the greater the permeate flux.

Example 3c: The procedure of Example 3b was repeated, except that the variations of retention level were measured as a function of the pressure.

Figure 5:
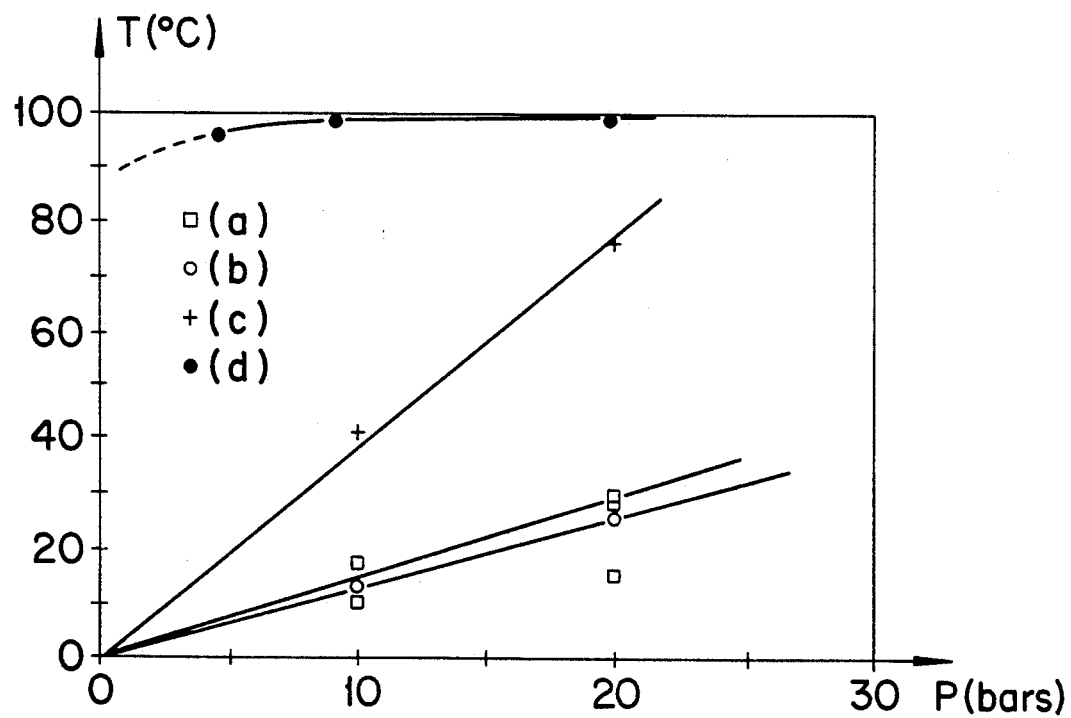
FIG. 5 shows variation of retention time as function of pressure.

The results obtained are presented in FIG. 5 where the retention level T in % has been represented on the y-axis.

Total retention of Yellow Acid ® (solution (d)) whose retention level T was higher than 95% from 5 bars and above, is observed in FIG. 5.

On the other hand, it will be seen that the retention of saccharose increased as a function of the pressure and became total at 25 bars.

The retention of sodium chloride was 20% at 20 bars.

EXAMPLE 4

Effect of acid (e) and basic (f) solutions on the membrane and the permeate flux An aqueous solution of nitric acid (e) at pH=1.66 and an aqueous solution of sodium hydroxide (f) at pH=12.3, were prepared.

Figure 6:
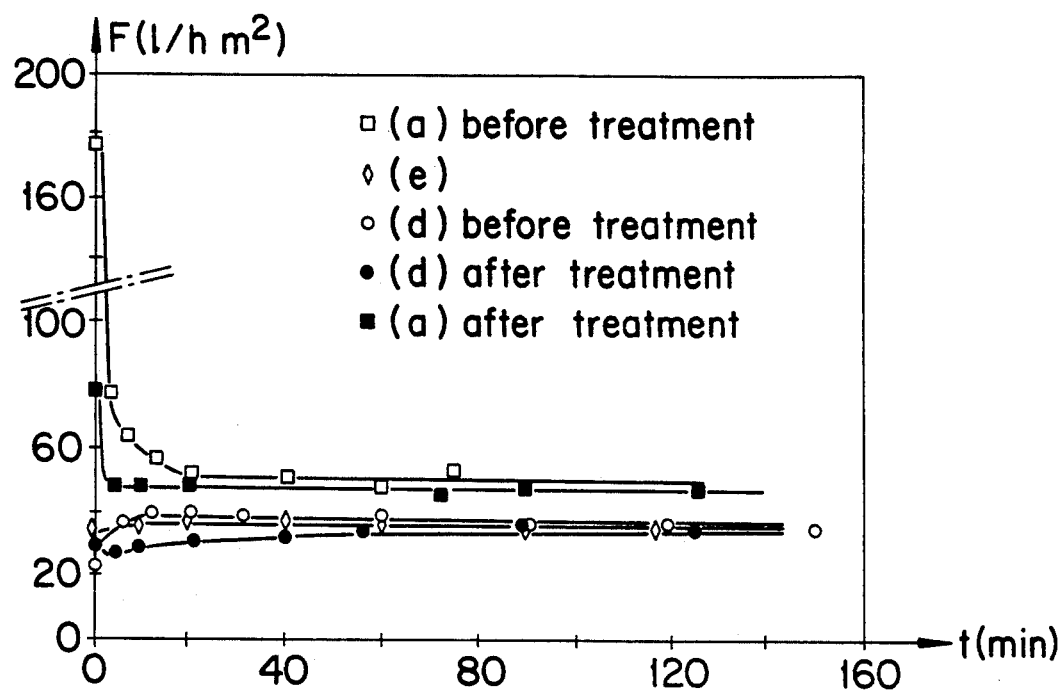
FIGS. 6 and 7 show variations in permeability flux with circulation time, during acid and base treatment of the membrane respectively.
Figure 7:
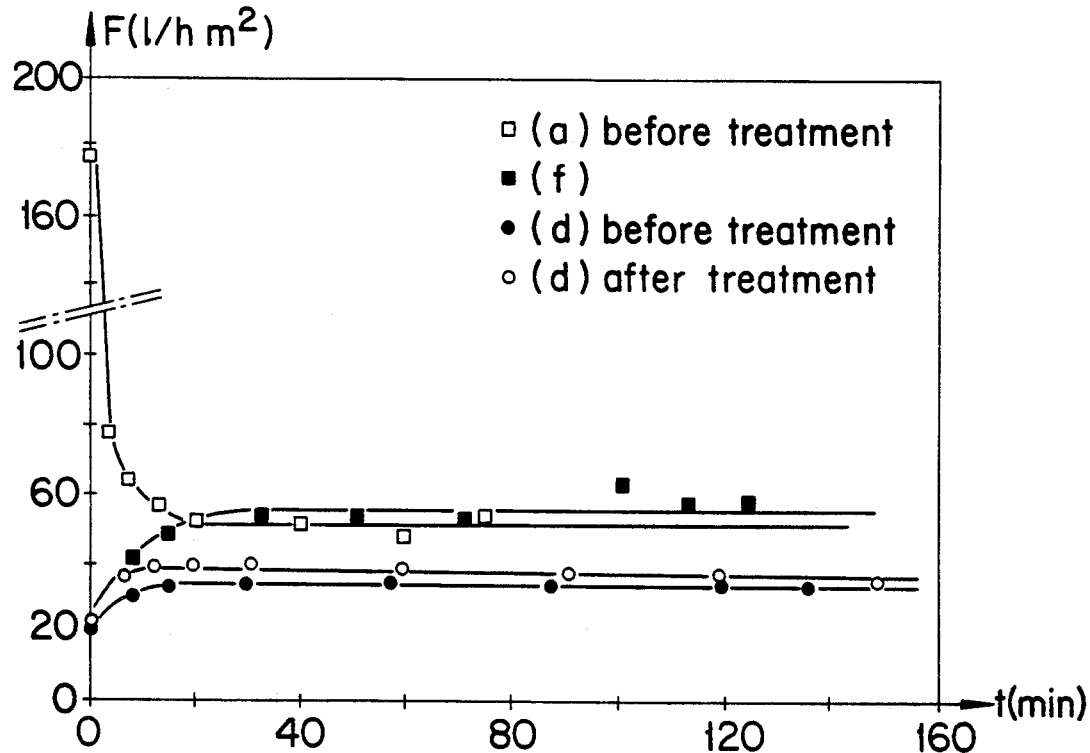

The permeate flux was compared for tap water (a) and for the solution (d) of Yellow Acid ® before and after acid treatment (FIG. 6) and after base treatment (FIG. 7).

The results obtained are presented in FIGS. 6 and 7 where the circulation time in min is plotted on the x-axis and the permeate flux density F in $l/h.m^2$ on the y-axis. The pressure was 20 bars and the temperature of the solutions was 40° C. During acid/base cleaning of the membrane, it was observed, in FIG. 6, that nitric acid did not affect the permeate flux and did not permit unblinding without, however, damaging the membrane. Indeed, the permeate flux in the quasistationary state for the nitric acid solution was almost identical to that of Yellow Acid. It will be observed, in FIG. 7, that the sodium hydroxide solution did not affect either the permeate flux or the slope of the curve for tap water (a) and the solution of Yellow Acid (d). Furthermore, the permeate flux in the quasistationary state for the sodium hydroxide solution was practically identical to that observed for pure water. Moreover, it was observed thereby that the sodium hydroxide solution did not damage the polymer membrane. Accordingly, sodium hydroxide eliminated fouling without damaging the membrane.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composite nanofiltration membrane comprising a porous inorganic support substrate, said substrate having face surfaces and having pore diameter ranging of from 3 to 10 nm, a polymer membrane which comprises an elastomeric polyphosphazene densely deposited on at least one of the face surfaces thereof, the structural porosity of said polyphosphazene membrane ranging from 0.2 -2 nm.

2. The composite nanofiltration membrane as defined by claim 1, wherein said polyphosphazene membrane is nested within the pores of said inorganic support substrate and/or providing a continuous coating layer thereon.

3. The composite nanofiltration membrane as defined by claim 2, wherein said microporous polyphosphazene membrane has a thickness ranging from 0.1 to 10 μm.

4. The composite nanofiltration membrane as defined by claim 1, wherein said inorganic support substrate comprises a macroporous metal or metallic alloy support having at least one inorganic membrane layer deposited onto at least one of the face surfaces thereof.

5. The composite nanofiltration membrane as defined by claim 4, wherein said at least one inorganic membrane layer comprises a metal oxide.

6. The composite nanofiltration membrane as defined by claim 5, wherein said metal oxide comprises beryllium, magnesium, calcium, aluminum, titanium, strontium, yttrium, lanthanum, zirconium, hafnium, thorium, iron, manganese or silicon.

7. The composite nanofiltration membrane as defined by claim 6, wherein said macroporous support comprises nickel, steel, carbon or a ceramic material.

8. The composite nanofiltration membrane as defined by claim 1, wherein said membrane is tubular.

9. The composite nanofiltration membrane as defined by claim 1, wherein said microporous polyphosphazene membrane has a structural porosity ranging from 0.8 to 1.5 nm.

10. The composite nanofiltration membrane as defined by claim 1, wherein said elastomeric polyphosphazene has the formula:

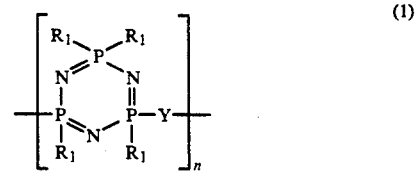

(1)

in which the radicals $R_1$, which may be identical or different, each have the formula:

(2)

in which $R_2$ and $R_3$, which may be identical or different, are each a linear or branched aliphatic hydrocarbon radical having from 1 to 12 carbon atoms, a cycloalkyl radical having from 3 to 8 carbon atoms, an aryl, alkylaryl or aralkyl radical having from 6 to 18 carbon atoms and the alkyl moiety of which having from 1 to 4 carbon atoms or a heterocycle having from 3 to 20 carbon atoms, the heteroatoms of which comprising O, S and N, with the proviso that $R_2$ and $R_3$ may together form, with the nitrogen atom from which they depend, a heterocycle having from 3 to 15 carbon atoms and which may also include another O, S and N heteroatom; the radicals Y have the formula:

(3)

in which the radicals $R_4$, which may be identical or different, are each a hydrogen atom or a radical $R_2$ or $R_3$; Z is a divalent hydrocarbon radical having from 1 to 20 carbon atoms and which may include at least one O, N and S heteroatom, with the proviso that two radicals $R_4$, may together form with Z, a heterocycle having from 3 to 15 carbon atoms; and n is an integer ranging from 10 to 30,000.

11. The composite nanofiltration membrane as defined by claim 10, wherein formula (1) $R_1$ is diphenylamino, N-naphthyl-2-N-propylamino, aziridino, imidazolyl, pyrollyl, indolyl, pyrrolinyl, 2-imidazolinyl, piperidinyl, morpholino, dibutylamino, or quinolinyl.

12. The composite nanofiltration membrane as defined by claim 10, wherein formula (1) Y is selected from the group consisting of

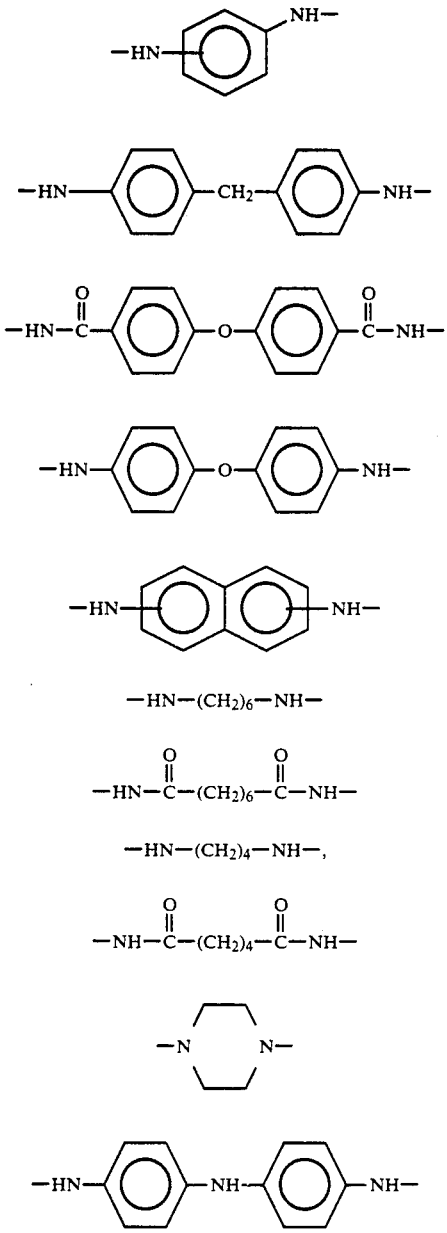

-continued

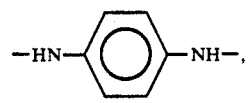

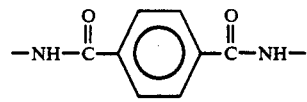

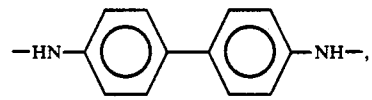

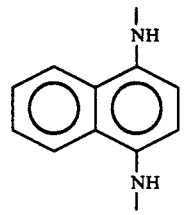

13. The composite ultrafiltration membrane as defined by claim 10, wherein $R_1$ is

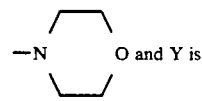 O and Y is

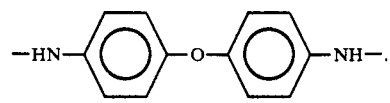

14. The composite nanofiltration membrane as defined by claim 1, wherein said membrane has a molecular weight cutoff ranging from 100 to 1,000 daltons.

15. In a process for separating an effluent of low molecular weight compounds by nanofiltration, the improvement comprising, using a composite nanofiltration membrane comprising a porous inorganic support having face surfaces, and a pore diameter ranging from 3 to 10 nm, and a polymer membrane comprising an elastomeric polyphosphazene densely deposited on at least one of said face surfaces thereof, the structural porosity of said polyphosphazene membrane ranging from 0.2-2 nm.

16. The process as defined by claim 15, including the step of varying the pressure of the effluent contacting said composite nanofiltration membrane.

* * * * *